(12) United States Patent
Fujiwara

(10) Patent No.: US 9,766,711 B2
(45) Date of Patent: *Sep. 19, 2017

(54) INFORMATION PROCESSING APPARATUS, INFORMATION PROCESSING METHOD AND PROGRAM TO RECOGNIZE AN OBJECT FROM A CAPTURED IMAGE

(71) Applicant: SONY CORPORATION, Tokyo (JP)

(72) Inventor: Tatsuo Fujiwara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,385

(22) Filed: Jan. 4, 2016

(65) Prior Publication Data

US 2016/0116987 A1 Apr. 28, 2016

Related U.S. Application Data

(63) Continuation of application No. 14/560,262, filed on Dec. 4, 2014, now Pat. No. 9,256,292.

(30) Foreign Application Priority Data

Dec. 11, 2013 (JP) ................................ 2013-256012

(51) Int. Cl.
*G06F 3/01* (2006.01)
*G06T 19/00* (2011.01)
*G06F 3/00* (2006.01)
*G06F 3/0481* (2013.01)
*G06T 7/246* (2017.01)

(52) U.S. Cl.
CPC .............. *G06F 3/017* (2013.01); *G06F 3/005* (2013.01); *G06F 3/04815* (2013.01); *G06T 7/251* (2017.01); *G06T 19/006* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| 2009/0128552 | A1* | 5/2009 | Fujiki | G06T 15/06 345/419 |
| 2012/0314902 | A1* | 12/2012 | Kimura | G06F 3/017 382/103 |
| 2013/0265218 | A1* | 10/2013 | Moscarillo | G06F 3/017 345/156 |
| 2014/0327611 | A1* | 11/2014 | Ono | G06F 3/0425 345/156 |

* cited by examiner

*Primary Examiner* — David D Davis
(74) *Attorney, Agent, or Firm* — Chip Law Group

(57) ABSTRACT

There is provided an information processing apparatus, which includes an input unit and a control unit. The input unit is configured to serially input an image captured by a capturing device. The control unit is configured to detect a user's hand from the input image, to recognize a position, a posture and a size of the hand detected while moving. A predetermined area of a surface on which the hand is moved as an operation area is defined based on the position, the posture and the size of the hand recognized. A virtual three dimensional object for operation by the user is produced disposed on the operation area. Also, an information processing method and a program are provided for the information processing apparatus.

14 Claims, 8 Drawing Sheets

INFORMATION PROCESSING APPARATUS, INFORMATION PROCESSING METHOD AND PROGRAM TO RECOGNIZE AN OBJECT FROM A CAPTURED IMAGE

CROSS REFERENCE TO RELATED APPLICATIONS

The present application is a continuation application of U.S. application Ser. No. 14/560,262 filed on Dec. 4, 2014, which claims the benefit of Japanese Priority Patent Application JP 2013-256012 filed Dec. 11, 2013, the entire contents of which are incorporated herein by reference.

BACKGROUND

The present technology relates to an information processing apparatus that can recognize an object from a captured image, an information processing method and a program for the information processing apparatus.

SUMMARY

In the past, a system using a flat surface such as a desk, a floor and a wall in a real world for operation has been proposed.

Japanese Patent Application Laid-open No. 2010-250464 discloses an apparatus for projecting with a projector an image including a button at a predetermined area of a flat surface such as a desk, detecting with a camera that fingers placed within the predetermined area touch the button, and capturing an image taken by the camera.

In the game art, there is a system for recognizing a user's gesture and executing processing in accordance with the gesture using a three dimensional measurement technique for measuring a shape or a three dimensional position of a three dimensional object from an image. The three dimensional measurement technique includes a passive method using a stereo etc., an image-based method and an active method for irradiating an IR pattern.

In the above-described Japanese Patent Application Laid-open No. 2010-250464, a projection area by the projector on the flat surface is defined as a user's operation area in advance. However, if the three dimensional image virtually displayed on the flat surface is, for example, to be operated, it is very difficult to acquire a depth and a shape by the above-described passive method or the image-based method.

Also, in the active method, if a distance exceeds a range where an irradiation signal reaches exceeds or if solar irradiation conditions change, it may be difficult to acquire shape information. Accordingly, in any method, it is difficult to define the operation area on the flat surface.

In view of the circumstances as described above, there is a need for providing an information processing apparatus being capable of easily define an operation area using a three dimensional image virtually displayed on a flat surface or a space of the real world, an information processing method and a program for the information processing apparatus.

According to an embodiment of the present technology, there is provided an information processing apparatus, including an input unit and a control unit. The input unit is configured to serially input an image captured by a capturing device. The control unit is configured to detect a user's hand from the input image, to recognize a position, a posture and a size of the hand detected while moving, to define a predetermined area of a surface on which the hand is moved as an operation area based on the position, the posture and the size of the hand recognized, and to produce a virtual three dimensional object for operation by the user disposed on the operation area.

The information processing apparatus having the above-described configuration can easily define the operation area using the three dimensional image virtually displayed on the flat surface or the space of the real world based on the position, the posture and the size of the hand.

The control unit may detect two hands of the user and define the operation area based on a distance between the hands after the moving.

This allows the information processing apparatus to easily define the operation area based on the distance between the hands.

The control unit may define a rectangular area having a diagonal line provided by the distance between the hands as the operation area.

This allows the information processing apparatus to define the operation area by an intuitive action of spreading both hands left and right or up and down.

The control unit may produce instruction information that instructs the user to move the hands and outputs the instruction information.

In this manner, the information processing apparatus can make the user to easily execute the action for defining the operation area. The instruction information may be an image or a voice. The image may be virtually or projection displayed near the hand detected.

The information processing apparatus further includes a memory unit configured to store an average image showing an average shape of the hand, a posture parameter about a hand posture change, and an individual difference parameter about an individual difference of the hand. In this case, the control unit may match the input image with the averaged hand image to detect the hand, change the posture parameter and the individual difference parameter from the average shape to produce a three dimensional model of the hand, render the three dimensional model produced, and match an edge component extracted from the rendered image with an edge component extracted from the input image to recognize the user's hand posture.

In this manner, the information processing apparatus can recognize the user's hand posture being lack of the texture component and being greatly changed its shape with high precision by changing the posture parameter and the individual difference parameter to serially produce a three dimensional model and matches it with the input image.

The control unit may fix the individual difference parameter upon the posture recognition by the matching while the user's hand moving and changes the posture parameter to recognize the posture of the hand.

In this manner, the information processing apparatus can reduce the time for rendering and recognize the posture at high speed by fixing the individual difference parameter in the posture recognition of the input image after the posture of the former input image is recognized.

The memory unit may store change range information showing the range over which the posture of the hand is capable of changing in a frame space of the input image. In this case, the control unit may limit the range over which the posture parameter is changed based on the change range information.

In this manner, the information processing apparatus can significantly decrease the number of trials for matching and recognize the posture at high speed by limiting the range over which the posture parameter is changed.

The control unit may fix the individual difference parameter and change the posture parameter to recognize the posture of the hand when the user operates the virtual three dimensional object.

In this manner, the information processing apparatus can also use the parameter upon the operation, the parameter being used when the operation area is defined.

According to another embodiment of the present technology, a method of processing information includes detecting a user's hand from an input image captured by a capturing device. The method further includes recognizing a position, a posture and a size of the hand detected while moving. Further, a predetermined area of a surface on which the hand is moved as an operation area is defined based on the position, the posture and the size of the hand recognized, and a virtual three dimensional object for operation by the user disposed on the operation area.

According to still another embodiment of the present technology, a program stored on a non-transitory computer readable medium causes an information processing apparatus to execute the steps of detecting a user's hand from an input image captured by a capturing device. The program further causes recognizing a position, a posture and a size of the hand detected while moving. Further, a predetermined area of a surface on which the hand is moved as an operation area is defined based on the position, the posture and the size of the hand recognized, and a virtual three dimensional object for operation by the user is produced disposed on the operation area.

As described above, according to the present technology, an operation area using a three dimensional image virtually displayed on a flat surface or a space of the real world can easily defined. However, the advantage does not necessarily limit the present technology.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

[System Overview]

Figure 1:
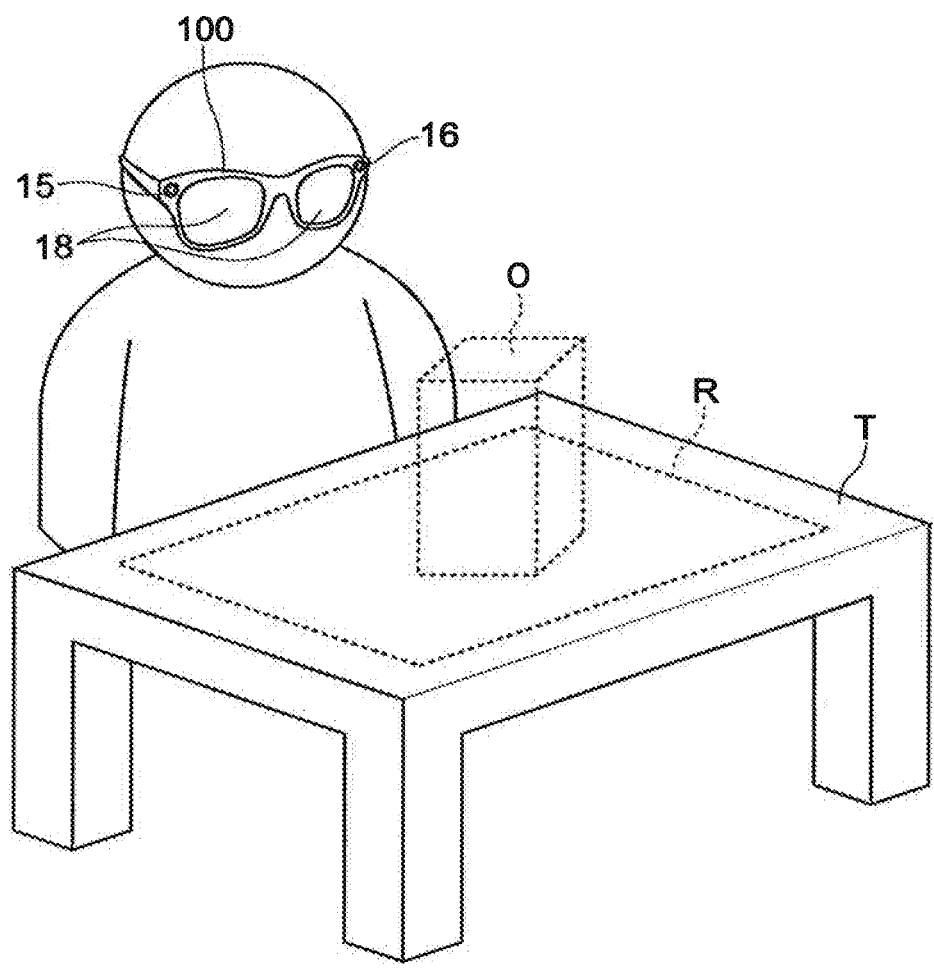
FIG. 1 is an overview of a system according to an embodiment of the present technology.

FIG. 1 is an overview of a system according to an embodiment of the present technology.

As shown in FIG. 1, according to the embodiment, a see-through glass type HMD (Head Mount Display) 100 is mounted on a head of a user and realizes a so-called virtual desk top environment where the user operates a virtual three dimensional object O displayed on a flat surface of a table T or the like, for example, as if it is present.

On the flat surface of the table T, an operation area R is defined. The user can operate the virtual three dimensional object O displayed within the operation area R using fingers or the like while viewing external environment.

According to the embodiment, the HMD 100 can define the operation area R based on an initializing action using user's hands as initializing processing upon the start of the user's operation.

[HMD Hardware Configuration]

Figure 2:
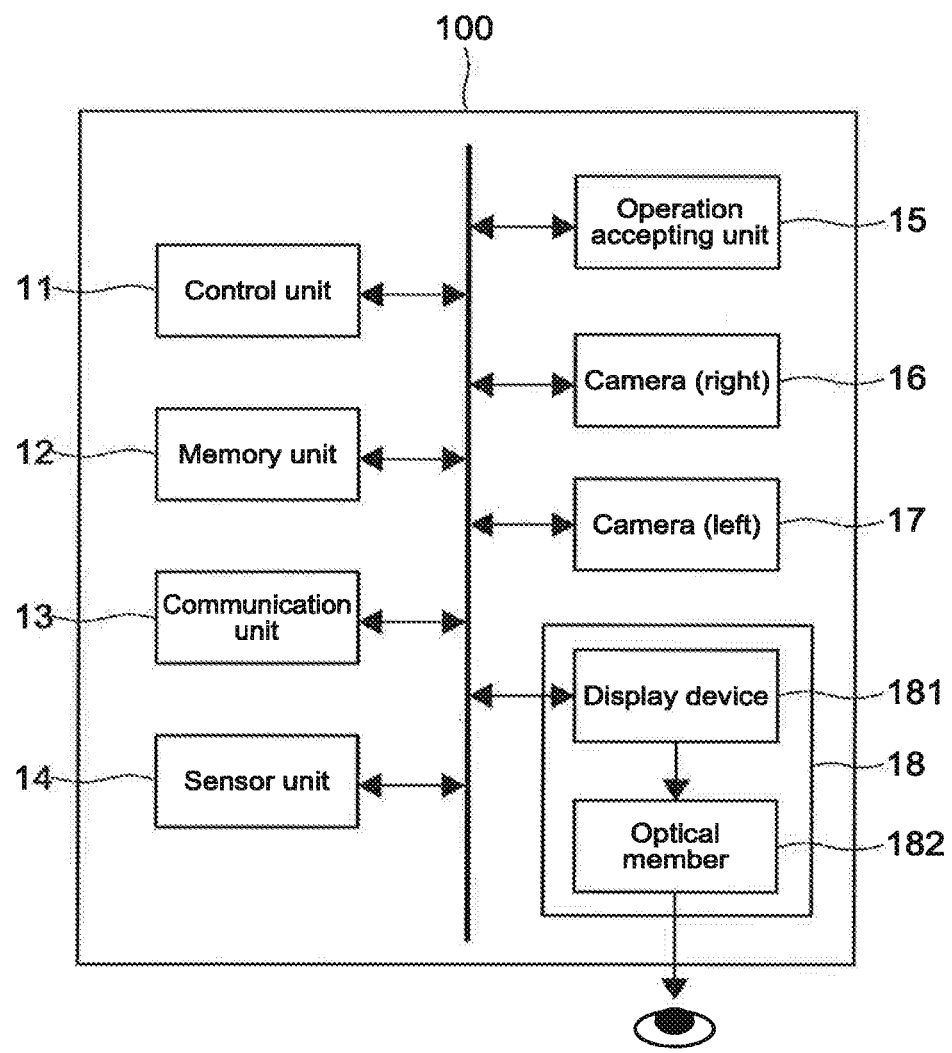
FIG. 2 is a block diagram showing a hardware configuration of a head mount display of the system.

FIG. 2 is a block diagram showing a hardware configuration of the HMD 100.

As shown in FIG. 2, the HMD 100 includes a control unit 11, a memory unit 12, a communication unit 13, a sensor unit 14, an operation accepting unit 15, a right camera 16, a left camera 17 and a display unit 18.

The control unit 11 is composed of a CPU (Central Processing Unit), a GPU (Graphics Processing Unit) or the like, for example. In the initializing processing, the control unit 11 performs a variety of arithmetic processes, controls whole blocks of the HMD 100, and preforms image processing such as drawing processing of the three dimensional object O.

The memory unit 12 is a non-volatile memory such as a flash memory (SSD; Solid State Drive) and other solid memory, for example. The memory unit 12 stores an OS, a variety of applications and a variety of data. In particular, according to the embodiment, the memory unit 12 stores dictionary data, parameter data and the like for detecting and tracking the user's hands as described later.

The communication unit 13 is a wireless communication module corresponding to standard including a wireless LAN (Local Area Network), e.g., a WiFi (Wireless Fidelity), and Bluetooth™, and can be communicated with a device such as a user's mobile smart phone.

The sensor unit 14 is composed of a variety of sensors such as a gyro sensor, an acceleration sensor and a geomagnetic sensor, and detects a posture, a position, a direction etc. of the HMD 100 (the user) for the display processing of the virtual three dimensional object O.

The operation accepting unit 15 is composed of a touch panel, a button and a switch, for example, and accepts the user's operation.

The right camera 16 and the left camera 17 are disposed at a right frame and a left frame of the HMD 100 (see FIG. 1), and function as stereo cameras for recognizing a position, a stereoscopic shape and a depth of an object disposed forward of the user based on a disparity between images captured by the both of the cameras. In the initializing processing according to the embodiment, the right camera 16 and the left camera 17 are used to detect the user's hands and their environment (the table T etc.).

The display unit 18 is composed of a transparent display, and includes a display device 181 and an optical member 182. The display unit 18 forms a three dimensional image by the display device 181 housed in the frame of the HMD 100, for example, guides an image light into the optical member 182, and emits the light to user's eyes, thereby providing the three dimensional image to the user.

The display device 181 is composed of an LCD (Liquid Crystal Display), for example. The optical member 182 has a deflection device (a hologram diffraction grating) and a light guide plate as a display surface. The deflection device allows to subject diffraction reflection of light having a specific wavelength corresponding to each color of RGB, and the light is subjected to total reflection within the light guide plate, thereby emitting the image to the user's eyes.

[HMD Database Configuration]

Figure 3:
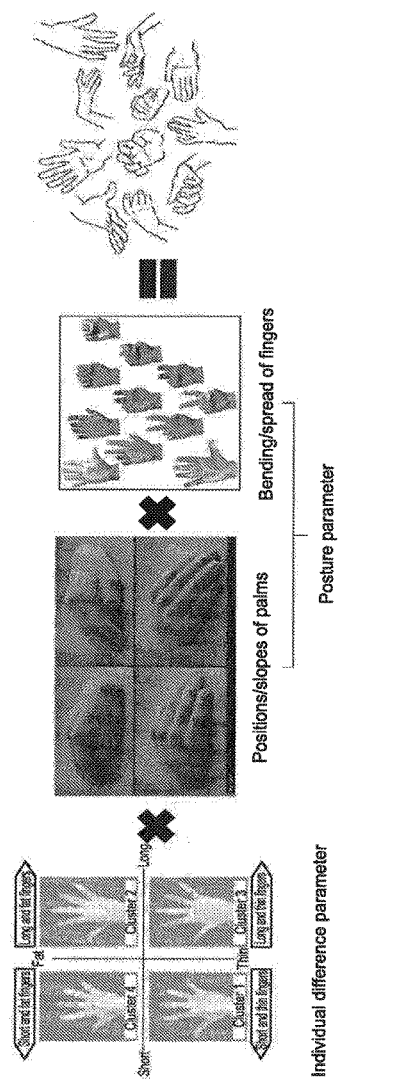
FIG. 3 is an illustrative drawing of a database held by the head mount display.

Next, a database on the memory unit 12 of the HMD 100 will be described. FIG. 3 is an illustrative drawing of the database.

As shown in FIG. 3, the HMD 100 stores a parameter representing individual differences in hands such as sizes (length, circumferences, widths, etc.) of fingers and palms (an individual difference parameter) and a parameter representing a variation of posture changes of the palms and the fingers (positions/slopes of the palms, bend/spread of fingers) (a posture parameter).

Specifically, we have five fingers per hand. Each finger can be bent with three joints in a palm direction and in a direction parallel to the palm. As to the finger bent, there are (3+1)×5=20 parameters. A position of the hand is stereoscopically represented by x, y, z directions using one point on the palm as an original point. In addition, a rotating direction of the hand can be stereoscopically represented by quaternion.

Accordingly, a posture of the hand can be represented by 20 (bending)+3 (position)+4 (rotation)=27 parameters.

The HMD 100 combines the parameters variously, produces a three dimensional model, performs rendering and matches it with an input image, thereby recognizing the posture of the user's hand.

Other than the parameters, the HMD 100 stores an edge distribution of a shape of an average hand (for example, with all five fingers are spread) as a dictionary in order to detect firstly the hand from the input image.

In addition to the parameters about the individual difference and the posture, parameters including illumination conditions, motion blurs, decoration such as rings and manicure, etc. may be stored.

[HMD Action]

Next, an action of the HMD 100 configured as described above will be described. In the later description, the control unit 11 of the HMD 100 is used mainly for the description of the action. The action is performed in cooperation with other hardware and software executed under the control of the control unit 11.

Figure 4:
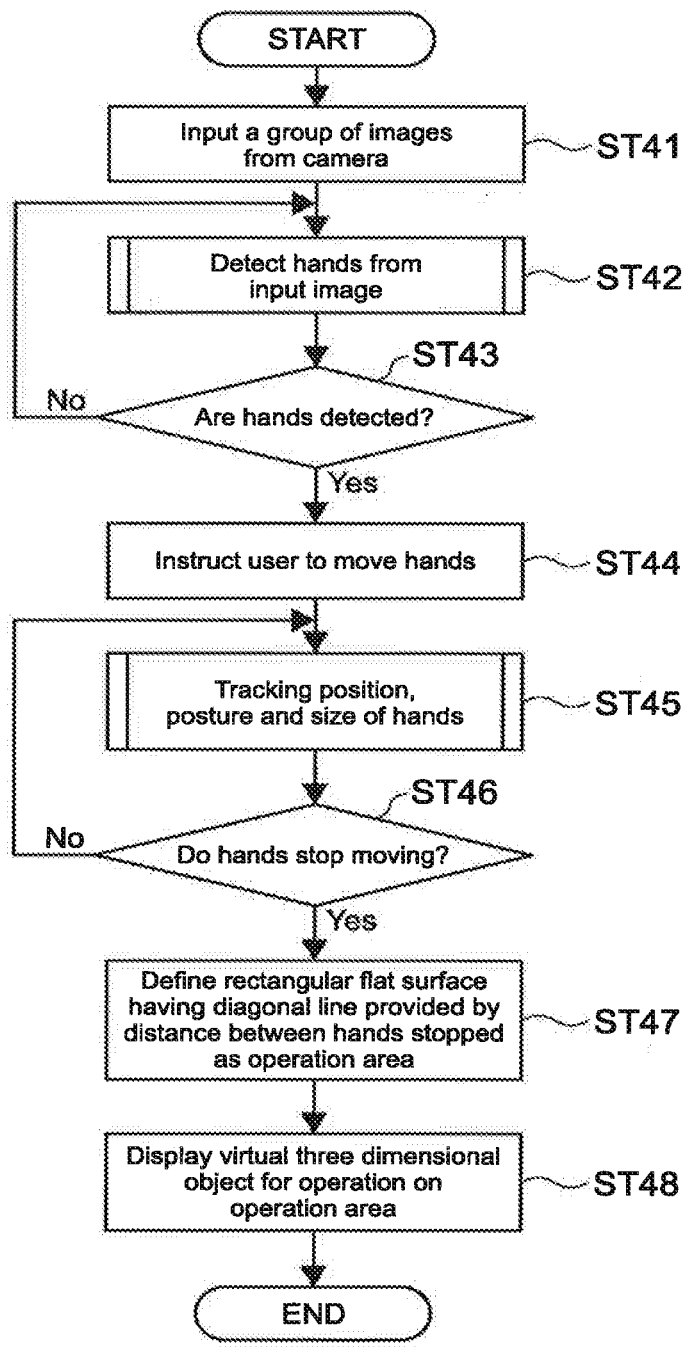
FIG. 4 is a flow chart of an operation area definition processing of the head mount display.
Figure 5A:
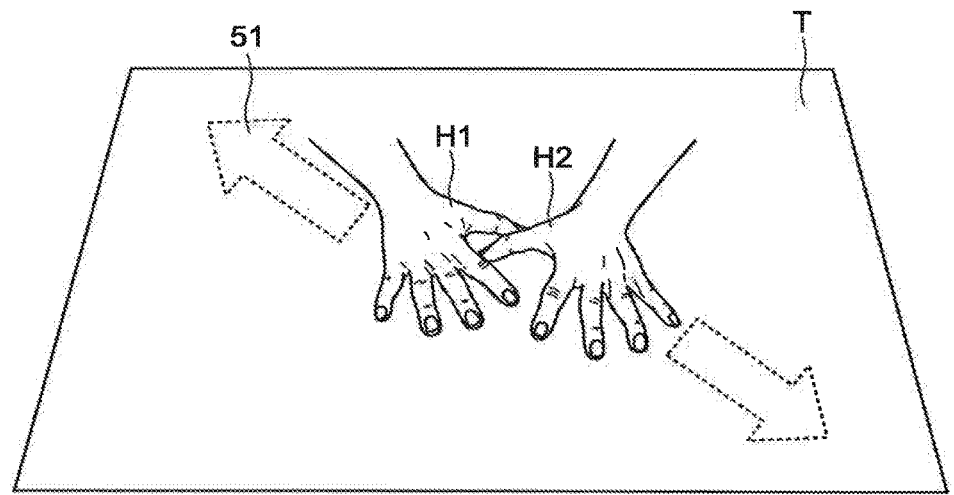
FIGS. 5A and 5B each is an example of a definition method of the operation area.
Figure 5B:
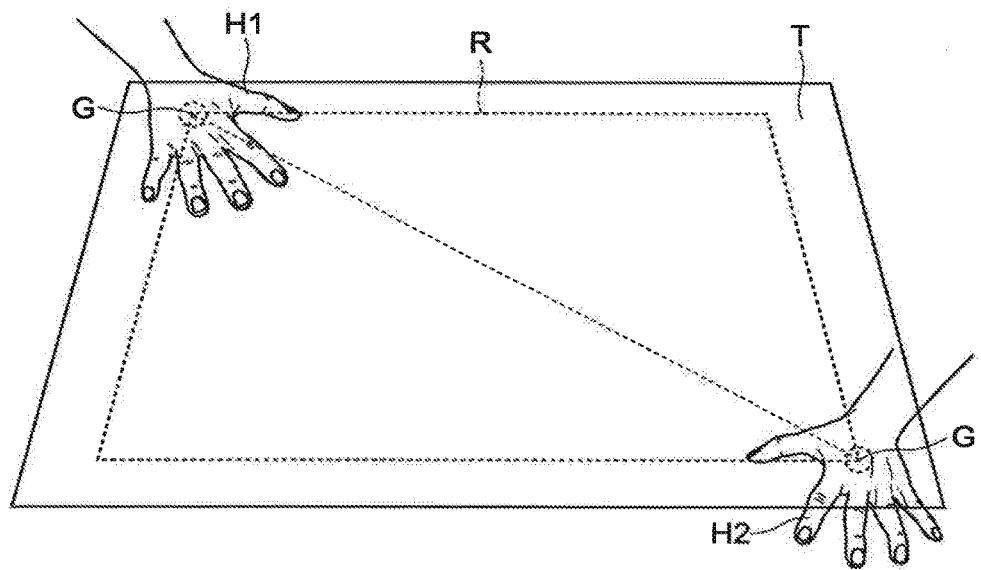

FIG. 4 is a flow chart showing definition processing of the operation area R by the HMD 100. FIGS. 5A and 5B each is an example of the definition processing of the operation area R.

As shown in FIG. 4, the control unit 11 of the HMD 100 input a group of images in a sight line direction of the user from the above-described cameras 16 and 17 (step 41).

At this time, the user lays the both hands on the table T roughly side by side.

Then, the control unit 11 detects the hands from the input image and fits the shapes of the hands in detail (step 42). The fitting processing of the hands will be described later.

When the hands are detected (Yes in Step 43), the control unit 11 instructs the user to move the hands (Step 44). For example, the control unit 11 displays arrows 51 on the display unit 18 that show diagonal directions where the both hands (H1, H2) are spread, as shown in FIG. 5A. The arrows are shown by the user as if they are actually on the table T.

Alternatively, the control unit 11 may output voice guidance to instruct to spread the both hands. In this case, the HMD 100 includes a voice output unit such as a speaker.

When the user moves the hands in accordance with the instruction, the control unit 11 tracks the position, the posture and the size of the hands while moving (Step 45).

The tracking processing is also described later. The HMD 100 can estimate the flat surface on which the hands are contacted from the transition of the posture.

Next, the control unit 11 determines whether or not the hands of the user stop moving (Step 46).

When the hands of the user are determined to be stopped moving (Yes), the control unit 11 defines a rectangular flat surface having a diagonal line provided by the distance between the hands stopped as the operation area R, as shown in FIG. 5B (Step 47).

The distance between the hands can be a distance between a gravity center position of a right hand H1 and a gravity center position of a left hand H2, for example, but is not limited thereto.

The control unit 11 produces a virtual three dimensional object for operation and provides a superimposed display on the display unit 18 as if the virtual three dimensional object is provided virtually on the operation area R defined as described above (Step 48). Hereafter, the user can operate and interact with the virtual three dimensional object by fingers, palms or the like.

Figure 6:
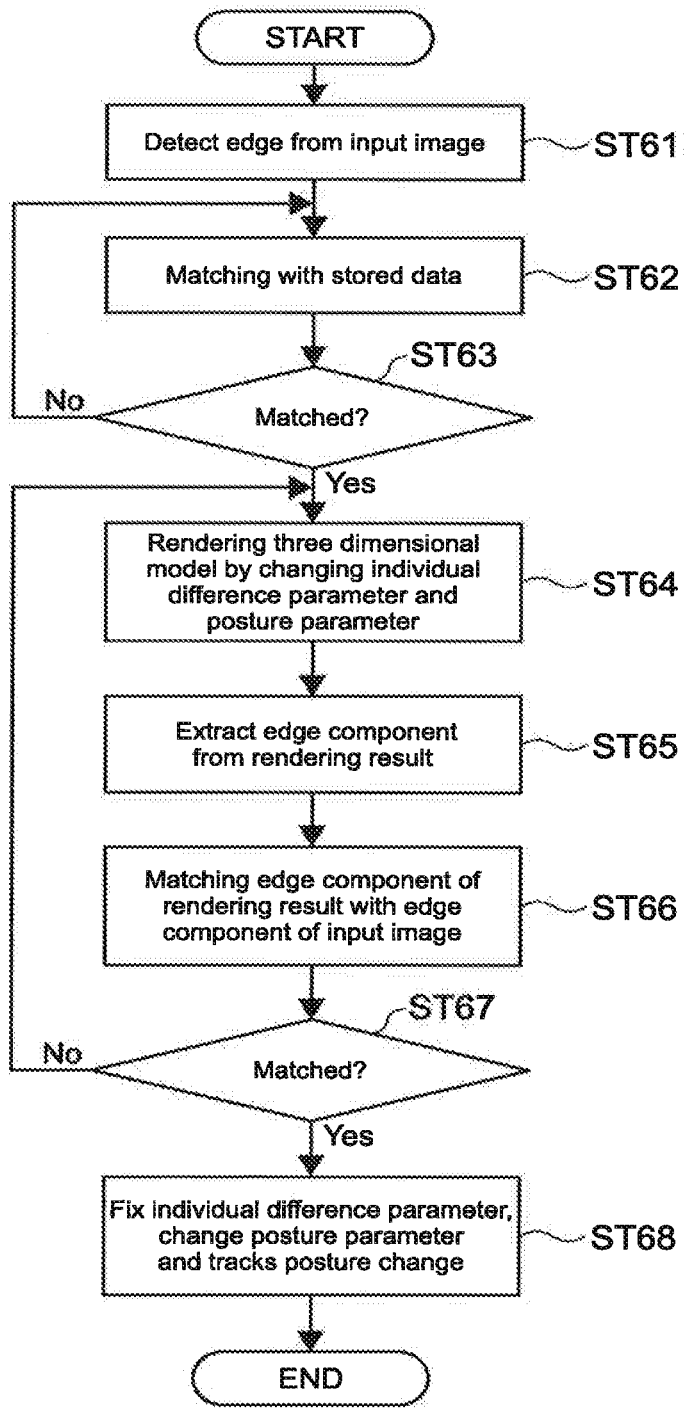
FIG. 6 is a flow chart of fitting and tracking processing by hands in the definition method of the operation area in detail.

Next, the above described fitting processing and the tracking processing will be described. FIG. 6 is a flow chart showing flow of the fitting processing and the tracking processing.

Figure 7:
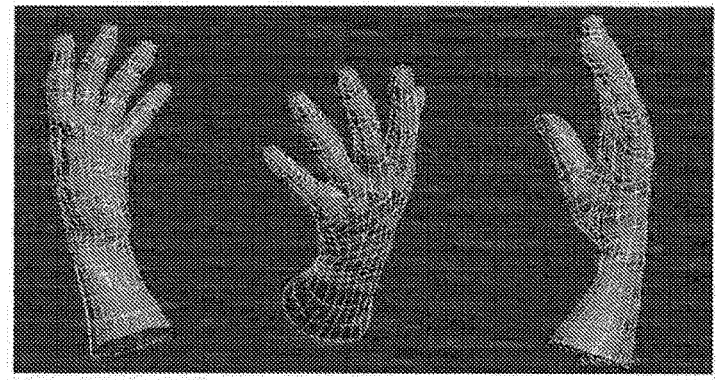
FIG. 7 shows a rendering in the fitting processing.
Figure 8:
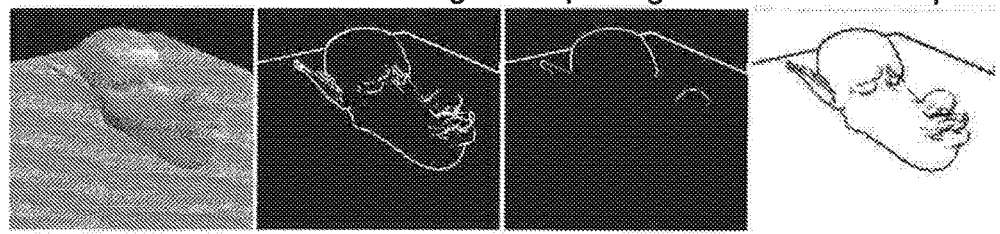
FIG. 8 shows an extraction processing of a contour component in the fitting processing.
Figure 9:
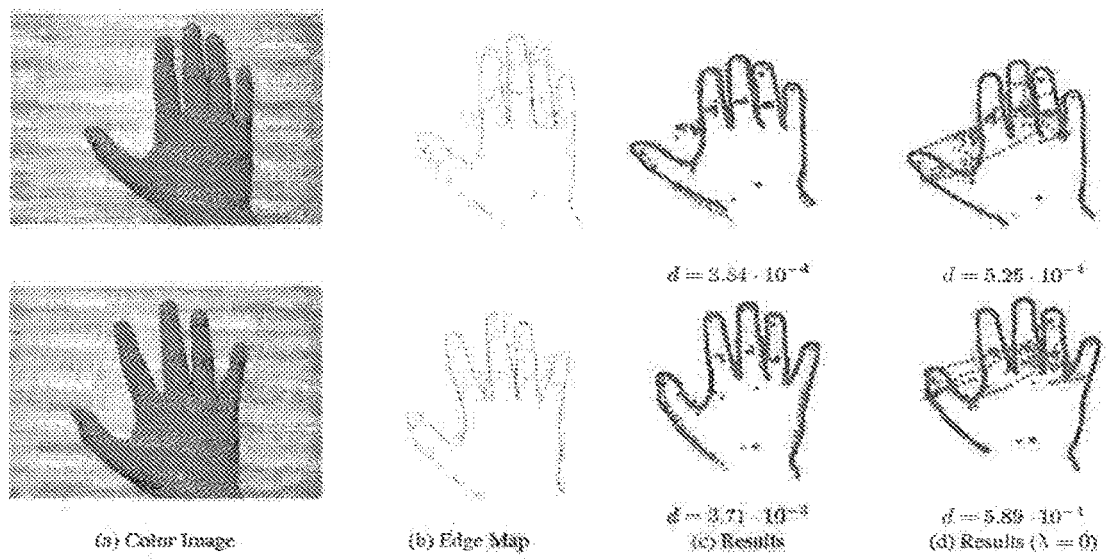
FIG. 9 shows a matching processing of the contour component in the fitting processing.

FIG. 7 shows the rendering in the fitting processing. FIG. 8 shows extraction processing of a contour component in the fitting processing. FIG. 9 shows matching processing of the contour component in the fitting processing.

As shown in FIG. 6, in the fitting processing, the control unit 11 firstly detects an edge component from an input image (Step 61).

Next, the control unit 11 matches edge distribution data about shapes of average hands stored in the storing unit 12 with an edge distribution detected from the input image (Step 62).

As to the matching, it is sufficient that only limited shapes of the hands and fingers may be searched to some degrees and their rough positions and shapes may be taken in accordance with rules in the initializing action, when the spread fingers are simulated in the initializing action as described above, for example. Accordingly, the memory unit 12 may store only the edge distribution of the limited shapes as a dictionary.

When the edge distributions are matched (Yes in Step 63), the control unit 11 uses the three dimensional model to fit the shapes of the user's fingers detected using the three dimensional model in detail.

Specifically, the control unit 11 searches the parameters closest to those of the input image by changing the posture parameter and the individual difference parameter based on stored data matched when the hands are detected (initial shapes) (Step 64).

In this case, the control unit 11 produces a three dimensional polygon model based on the parameters set and performs a rendering of the model, as show in FIG. 7.

Note that as the hands themselves lack a texture component, the fitting is sufficient as long as the edge component including contour and shade caused by convexoconcave is focused. As shown in FIG. 8, the control unit 11 applies edge detection to a normal map and a depth map resulting from the rendering (a normal edge image and a depth edge image shown in the second and third images in FIG. 8) and produce an image where only the edge component produced at the contour etc. is extracted (Step 65, a right end image of the contour component in FIG. 8).

Then, the control unit 11 matches the image of the contour component with the input image to which the edge detection is applied on an edge basis similar to the detection processing, as shown in FIG. 9 (Step 66). This allows the parameter fitted to the input image to be determined. In FIG. 9, matching results (c) second from the right show images with insufficient fitting, and matching results (d) at the right end show images closest to the input image.

In the matching processing, a typical matching algorithm such as an ICP (Interactive Closest Point) is applied.

When the matching is done (Yes in Step 67), the control unit 11 tracks the posture of the hands by the fitting as described above also in a subsequent frame. In this case, the individual difference parameter will not be changed as long as the same user is searched. The control unit 11 fixes the individual difference parameter and changes only the posture parameter.

In addition, the control unit 11 can limit a parameter change range to a narrow range by limiting the posture change possible between frames based on the frame space of the input image. In this case, the memory unit 12 stores change range information showing the range over which the posture of the hands can be changed in the frame space of the input image, and the control unit 11 limits the range over which the posture parameter is changed based on the change range information. In this way, the number of trials is significantly decreased such that real-time high speed processing can be possible.

Also, the control unit 11 can fix the individual difference parameter and changes only the posture parameter, whereby recognizing the posture of the hands when the operation by the user's hands is detected after the virtual three dimensional object is displayed.

When the user feels that the operation area R defined is too narrow etc., the operation area R may be re-defined. In this case, the control unit 11 may accept a re-definition operation of the operation area R from the operation accepting unit 15, and may then execute the processing shown in FIG. 4.

As described above, according to the embodiment, the HMD 100 can recognize the flat surface area of the real world being lack of the texture component based on the transitions of the position, the posture and the size of the user's hands, and easily define the operation area R for operation using the three dimensional image virtually displayed on the flat surface area. In this case, the user can easily define the operation area R by an intuitive action of spreading both hands in the diagonal line. Also, the HMD 100 can detect the shapes of the hands being lack of the texture component with high precision and acquire them at high speed by using the parameters about the individual difference and the posture change.

Alternative Embodiment

The present technology is not limited to the above-described embodiments, and variations and modifications may be made without departing from the scope of the present technology.

In the above-described embodiment, as the initializing action for defining the operation area by the user, the action of spreading the user's hands in the diagonal line is shown. Note that the initializing action is not limited thereto.

For example, an aspect ratio in a rectangular operation area is defined in advance. By spreading the both hands left and right or up and down, the distance between the both hands can be set to a length of the operation area in a vertical direction or in a horizontal direction.

Also, the operation area may be defined by only a single hand. For example, motion along the diagonal line may be executed by the single hand. The hand may be moved along a rectangular shape and a rectangular area may be defined as the operation area. The hand may be moved along a circle and a rectangular area having the predetermined aspect ratio including the whole circle may be defined as the operation area.

In the above-described embodiment, the control unit 11 can switch a start-up mode depending on the initializing action by the user, i.e., the motion along the diagonal line being done right up (left down) or left up (right down).

In the above-described embodiment, the operation area R is defined on the table T. Note that the present technology is not limited to the illustrative embodiment. For example, the operation area R may be defined on a horizontal surface such as a floor, a vertical surface such as a wall surface and a white board, or an arbitrary space other than the flat surface.

In the above-described embodiment, the hands are recognized as an example. Note that the above-described embodiment is applicable to recognize an object having an individual difference in a shape and being lack of the texture including a cup and other earthen wares, fixtures and furniture.

In the above-described embodiment, the present technology is applied to a see-through glass type HMD having a stereo camera, but the present technology is not limited thereto. For example, a retina projector may be used in the display unit for the similar wearable device.

The present technology may be attained by combining a variety of display devices such as a non-see-through HMD, a smartphone, a display of a desk top PC and a projector with a variety of depth sensors such as a TOF (Time of Flight) sensor other than the stereo camera and an IR (infrared) pattern irradiation type sensor.

The present technology may have the following configurations:

(1) An information processing apparatus, including:
an input unit configured to serially input an image captured by a capturing device; and
a control unit configured to detect a user's hand from the input image, to recognize a position, a posture and a size of the hand detected while moving, to define a predetermined area of a surface on which the hand is moved as an operation area based on the position, the posture and the size of the hand recognized, and to produce a virtual three dimensional object for operation by the user disposed on the operation area.

(2) The information processing apparatus according to (1) above, in which
the control unit detects two hands of the user and defines the operation area based on a distance between the hands after the moving.

(3) The information processing apparatus according to (2) above, in which
the control unit defines a rectangular area having a diagonal line provided by the distance between the hands as the operation area.

(4) The information processing apparatus according to (1) above, in which
the control unit produces instruction information that instructs the user to move the hands and outputs the instruction information.

(5) The information processing apparatus according to (1) above, further including:
a memory unit configured to store an average image showing an average shape of the hand, a posture parameter about a hand posture change, and an individual difference parameter about an individual difference of the hand, in which
the control unit matches the input image with the averaged hand image to detect the hand, changes the posture parameter and the individual difference parameter from the average shape to produce a three dimensional model of the hand, renders the three dimensional model produced, and matches an edge component extracted from the rendered image with an edge component extracted from the input image to recognize the user's hand posture.
(6) The information processing apparatus according to (5) above, in which
the control unit fixes the individual difference parameter upon the posture recognition by the matching while the user's hand moving and changes the posture parameter to recognize the posture of the hand.
(7) The information processing apparatus according to (6) above, in which
the memory unit stores change range information showing the range over which the posture of the hand is capable of changing in the frame space of the input image, and
the control unit limits the range over which the posture parameter is changed based on the change range information.
(8) The information processing apparatus according to (6) above, in which
the control unit fixes the individual difference parameter and changes the posture parameter to recognize the posture of the hand when the user operates the virtual three dimensional object.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus, comprising:
an input unit configured to serially input an image captured by a capturing device; and
a control unit configured to:
detect a hand of a user from the input image,
recognize at least one of a position or a posture of the hand detected during movement of the hand of the user based on a guide for the user to move the hand,
define an area of a surface on which the hand is moved as an operation area after the at least one of the position or the posture of the hand is recognized, and
generate a virtual three dimensional object for operation by the user disposed on the operation area.
2. The information processing apparatus according to claim 1, wherein
the control unit is further configured to define the area of the surface based on a determination that the hand of the user stops moving.
3. The information processing apparatus according to claim 1, wherein
the guide is at least one of a graphical user interface or an audio.
4. The information processing apparatus according to claim 1, wherein
the control unit is further configured to detect the hand of the user and define the area of the surface on which the hand of the user is placed.
5. The information processing apparatus according to claim 4, wherein
the control unit is further configured to estimate the surface based on transition of the posture of the hand.
6. The information processing apparatus according to claim 1, wherein
the control unit is further configured to detect both hands of the user and define the operation area based on a distance between the both hands after the both hands are moved.
7. The information processing apparatus according to claim 1, further comprising:
a memory unit configured to store an average image showing an average shape of the hand, a posture parameter about a hand posture change, and an individual difference parameter about an individual difference of the hand,
wherein the control unit is further configured to match the input image with the average image to detect the hand, change the posture parameter and the individual difference parameter from the average shape to generate a three dimensional model of the hand, render the generated three dimensional model of the hand, and match an edge component extracted from the rendered three dimensional model of the hand with an edge component extracted from the input image to recognize the posture of the hand of the user.
8. The information processing apparatus according to claim 7, wherein during the movement of the hand of the user,
the control unit is further configured to fix the individual difference parameter based on the posture recognition by the matching during the movement of the hand of the user and change the posture parameter to recognize the posture of the hand.
9. The information processing apparatus according to claim 8, wherein
the memory unit is further configured to store change range information showing a range over which the posture of the hand is capable of changing in a frame space of the input image, and
the control unit is further configured to limit the range over which the posture parameter is changed based on the change range information.
10. The information processing apparatus according to claim 8, wherein
the control unit is further configured to fix the individual difference parameter and change the posture parameter to recognize the posture of the hand based on an operation of the virtual three dimensional object by the user.
11. A method of processing information, comprising:
detecting a hand of a user from an input image captured and serially inputted by a capturing device;
recognizing at least one of a position or a posture of the hand detected during movement of the hand of the user based on a guide for the user to move the hand;
defining an area of a surface on which the hand is moved as an operation area after the at least one of the position or the posture of the hand is recognized; and
generating a virtual three dimensional object for operation by the user disposed on the operation area.
12. The method of processing information according to claim 11, wherein the area of the surface is defined based on a determination that the hand of the user stops moving.

13. A non-transitory computer-readable storage medium having stored thereon a set of computer-executable instructions that, when executed by a processor, is configured to cause an information processing apparatus to perform operations, comprising:
- detecting a hand of a user from an input image captured and serially inputted by a capturing device;
- recognizing at least one of a position or a posture of the hand detected during movement of the hand of the user based on a guide for the user to move the hand;
- defining an area of a surface on which the hand is moved as an operation area after the at least one of the position or the posture of the hand is recognized; and
- generating a virtual three dimensional object for operation by the user disposed on the operation area.

14. The non-transitory computer readable storage medium according to claim 13, wherein
the area of the surface is defined based on a determination that the hand of the user stops moving.

* * * * *